(12) United States Patent
Ichiyama

(10) Patent No.: US 6,686,674 B2
(45) Date of Patent: Feb. 3, 2004

(54) MOTOR HAVING SINGLE CONE FLUID DYNAMIC BEARING BALANCED WITH MAGNETIC ATTRACTION

(75) Inventor: Yoshikazu Ichiyama, Kyoto (JP)

(73) Assignee: Kura Laboratory Corporation, Kyoto (JP)

(*) Notice: Subject to any disclaimer, the term of this patent is extended or adjusted under 35 U.S.C. 154(b) by 0 days.

(21) Appl. No.: 09/985,003

(22) Filed: Nov. 1, 2001

(65) Prior Publication Data
US 2002/0067089 A1 Jun. 6, 2002

(30) Foreign Application Priority Data

Dec. 4, 2000 (JP) ...................... 2000-368187
Jul. 23, 2001 (JP) ...................... 2001-221171

(51) Int. Cl.[7] .............................................. H02K 5/16
(52) U.S. Cl. .......................... 310/90; 310/90.5; 384/107
(58) Field of Search .................. 310/90, 90.5; 384/100, 384/226, 110, 108, 107, 124, 121, 132

(56) References Cited

U.S. PATENT DOCUMENTS

| | | | | |
|---|---|---|---|---|
| 3,399,001 A | * | 8/1968 | Whitaker | 384/110 |
| 5,598,048 A | * | 1/1997 | Dunfield et al. | 310/90.5 |
| 5,647,672 A | * | 7/1997 | Fukutani | 384/100 |
| 5,789,839 A | | 8/1998 | Langenbeck | |
| 5,854,524 A | | 12/1998 | Lee | |
| 5,873,657 A | | 2/1999 | Lee | |
| 5,947,608 A | | 9/1999 | Kim | |
| 6,019,516 A | * | 2/2000 | Leuthold et al. | 384/110 |
| 6,046,881 A | | 4/2000 | Tielemans et al. | |
| 6,066,903 A | * | 5/2000 | Ichiyama | 310/90 |

FOREIGN PATENT DOCUMENTS

JP 07-007886 * 10/1995 ............ H02K/7/08

OTHER PUBLICATIONS

Extract of Japanese Utility Model Laid–Open Pub. No. 06–004731, dated Jan. 21, 1994.
Patent Abstract of Japan, No. 06–315242, dated Nov. 8, 1994.
Patent Abstract of Japan, No. 07–007886, dated Jan. 10, 1995.
Patent Abstract of Japan, No. 2000–004557, dated Jan. 7, 2000.
Patent Abstract of Japan, No. 2000–205248, dated Jul. 25, 2000.
Patent Abstract of Japan, No. 2001–027225, dated Jan. 30, 2001.
Patent Abstract of Japan, No. 2001–027226, dated Jan. 30, 2001.

* cited by examiner

Primary Examiner—Nicholas Ponomarenko
Assistant Examiner—Nguyen Hanh
(74) Attorney, Agent, or Firm—Armstrong, Westerman & Hattori, LLP.

(57) ABSTRACT

A single cone fluid dynamic bearing motor, including a shaft having a diminishing conical taper surface, a sleeve having a concavity opposite the shaft, lubricant filled in a clearance between the shaft and the sleeve, and magnetic members to generate magnetic attraction between the shaft and the sleeve. Grooves are formed on the conical taper surface of the shaft or the sleeve so as to create load capacity when the motor rotates, whereby rotating parts of the motor are supported by the axial components of the load capacity balanced with the magnetic attraction. The motor thereby achieves reduction in thickness, current, and cost, and inhibits non-repeatable runout.

17 Claims, 15 Drawing Sheets

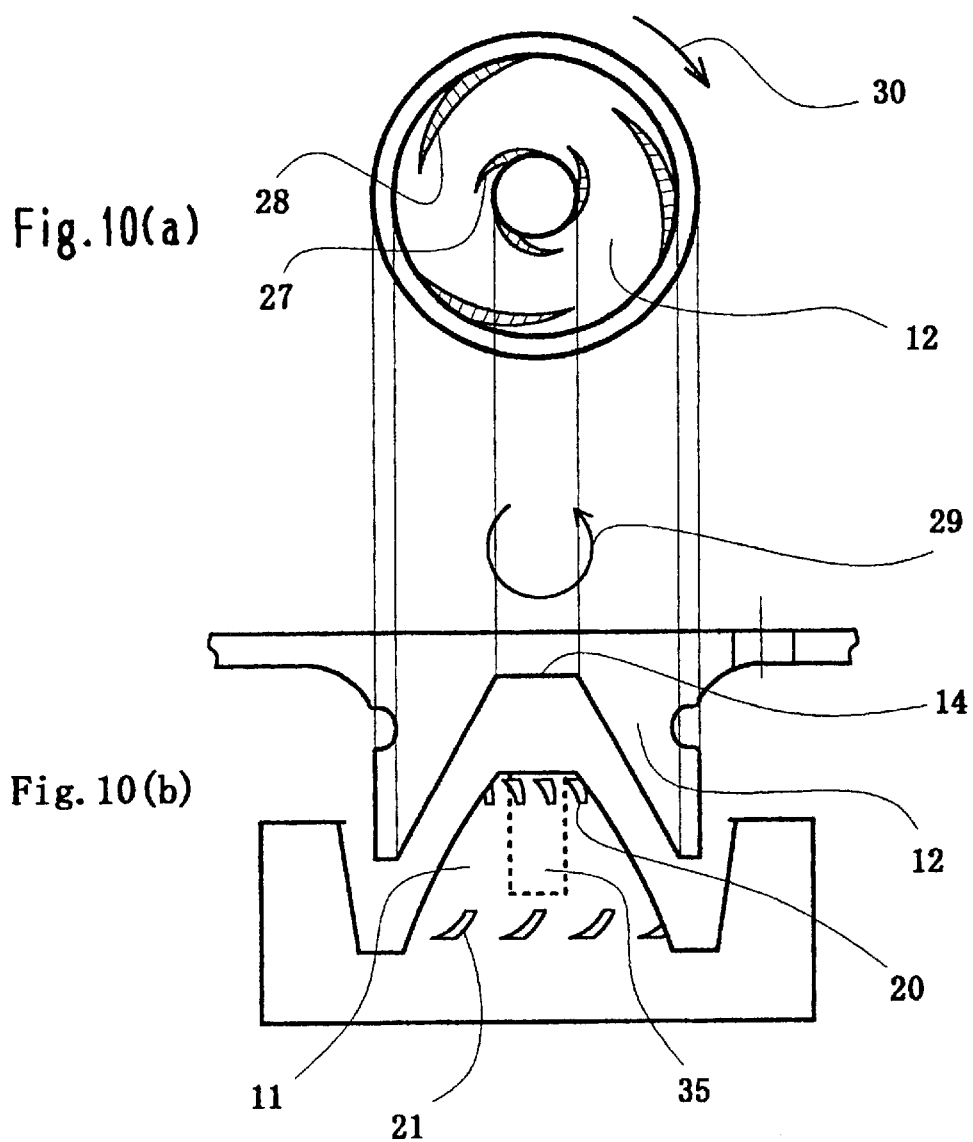

MOTOR HAVING SINGLE CONE FLUID DYNAMIC BEARING BALANCED WITH MAGNETIC ATTRACTION

BACKGROUND OF THE INVENTION

1. Technical Field of the Invention

The present invention relates to a fluid dynamic bearing motor, and more particularly to a fluid dynamic bearing having a conical shape to enable the motor to be smaller in thickness and lower in cost.

2. Description of the Related Art

There has been a trend toward the fluid dynamic bearing motor as the power source for rotary memory devices, cooling fans, and the like, because of its quietness in operation and the necessity to reduce nonrepeatable runout (NRRO) of rotating parts. Portable applications of such electronic devices have been widespread, increasing the demands for further reduction in their thickness and required current. However, there are limitations on further reduction in thickness of the fluid dynamic bearings, because they need to have a certain span between the bearings for supporting the shaft in order to inhibit NRRO. Also, in order to maintain a constant clearance between the bearings, they must be machined with extreme precision in the order of submicrons, whereby it is difficult to produce them at low cost.

In order to make fluid dynamic bearings thinner, a novel structure is necessary which does not require two bearings for supporting the shaft at axially spaced positions. The bearings should have as little sliding area as possible so as to achieve a reduction in the required current. Further, cost reduction will be achieved through the development of a structure wherein the bearing clearance is maintained with necessary accuracy even with the components machined with a lower degree of precision.

Single cone fluid dynamic bearings, which can support loads of both radial and thrust directions, have attracted attention as having potentialities in many respects. However, while some single cone structures that help decrease the thickness of the bearing have been proposed, for example, in Japanese Laid-open Utility Model Publication No. Hei. 06-004731, these are for air dynamic bearings and anyway have not been very successful. The main reason is that the single cone bearing is structurally incapable of sufficiently inhibiting NRRO during rotation. Japanese Laid-open Patent Publications No. 2000-004557 and No. 2000-205248 propose combined use of a conical bearing and a cylindrical bearing to improve the overall performance. However, the cylindrical bearing requires high-degree machining precision for maintaining a constant bearing clearance, canceling out the advantages of the conical bearing. U.S. Pat. No. 5,854,524 discloses a single semi-spherical air dynamic bearing having a similar structure as that of the single cone bearing, but in this case also, the radius of two spherical surfaces must be strictly controlled to secure a sufficient radial load capacity, because of which cost reduction is hardly achievable.

Thus the problems yet to be resolved in single cone fluid dynamic bearing motors are how to improve the stability in its rotating attitude, and how to realize a structure which prevents leakage of the lubricant and yet is easy to assemble.

SUMMARY OF THE INVENTION

An object of the present invention is to resolve these problems and to provide a single cone fluid dynamic bearing motor which can be reduced in thickness and required current, and is simple and can be produced at lower cost.

A fluid dynamic bearing motor according to a first aspect of the present invention includes a shaft having a diminishing conical taper surface, a sleeve having a conical concavity opposite the shaft, lubricant filled in a clearance between the shaft and the sleeve, and means for generating magnetic attraction between the shaft and the sleeve. In this construction, a series of grooves are formed on a conical taper surface of one of the shaft and the sleeve, and the grooves are provided for creating load capacity when the motor rotates, whereby rotating parts of the motor are supported by axial components of the load capacity balanced with the magnetic attraction.

The clearance between the shaft and the sleeve at their peripheries increases in width toward outside to form a taper seal of the lubricant utilizing its surface tension. The magnetic attraction is developed by a stator core arranged on the fixed side and an opposite rotor magnet, or by a rotor magnet and a magnetic piece fixed opposite to the rotor magnet. Apart from the opening on the outer peripheral surface, the motor has no joints through which lubricant may possibly leak to the outside.

According to the fluid dynamic bearing motor of the present invention, the load capacity created by the rotation of the motor acts vertically with respect to the conical surfaces, causing the shaft and the sleeve to rotate in non-contact relationship at a position where the axial components of the load capacity and the magnetic attraction are in equilibrium. The radial components of the load capacity counterbalance each other at respective circumferential points, thereby contributing to the centering of the rotating parts. The load capacity itself acts vertically on the tapered surface of the cone, and therefore it serves to adjust the attitude of rotating parts when they tilt with respect to the fulcrum conforming to the cone apex.

The main reason why the prior art single cone bearing has failed to maintain the attitude of rotating parts is that the bearing was provided only with a load equal to the weight of its own, or even less than that by using a magnetic bearing in order to avoid friction during the initial and final periods of operation as disclosed in Japanese Laid-open Utility Model Publication No. Hei. 06-004731. As has been explained above, a good balance is achieved between two forces of the axial component of load capacity of the bearing versus the load. Therefore, a small load can only create a small load capacity, which is insufficient to create forces for maintaining stable attitude of rotating parts. In the fluid dynamic bearing of the present invention, a large load is applied on the bearing by the magnetic attraction acted between the shaft and the sleeve. Therefore, the load capacity of the bearing, which counterbalances-the-load, can be set to-a desired-large value, whereby the stability of the attitude of rotating parts is improved. The magnetic attraction may be varied case by case depending on permissible level of NRRO, the size of the motor, and various other conditions.

A fluid dynamic bearing motor according to a second aspect of the invention includes a shaft having a diminishing conical taper surface, a sleeve having a conical concavity opposite the shaft, lubricant filled in a clearance between the shaft and the sleeve, means for generating magnetic attraction between the shaft and the sleeve, and an annular wall arranged around the shaft to face an outer circumferential wall of the sleeve, a clearance between the annular wall and the outer circumferential wall of the sleeve being increased in width toward an open end to form a taper seal of the lubricant. In this construction, a plurality of grooves are formed on a conical taper surface of one of the shaft and the sleeve, and the grooves are provided for creating load capacity when the motor rotates, whereby rotating parts of the motor are supported by axial components of the load capacity balanced with the magnetic attraction. The boundary of the lubricant is positioned around the sleeve, so as to enable a reliable seal to be formed even in high-speed operation.

A ring-shaped member is fixed to one end of the annular wall which is arranged around the shaft, and an annular recess is provided in the outer circumferential wall of the sleeve, the inner periphery of the ring-shaped member being positioned within the annular recess, so as to restrict an axial movable distance of the rotating parts. This structure serves as a stopper for the rotating parts in the case where the motor is subjected to a large shock.

The shaft includes a clearance adjusting piece held inside. The clearance adjusting piece is assembled with the shaft such that it is initially held movably but firmly enough to overcome the magnetic attraction as being substantially protruded from one end of the shaft, and is pressed into the shaft by a pressure larger than the magnetic attraction applied from both ends of the shaft and the sleeve to a predetermined position, where the cone apex of the sleeve or a plate spring interposed between the apex of the sleeve and the clearance adjusting piece is resiliently deformed, whereby when the motor is stationary the clearance adjusting piece and the apex of the sleeve or the plate spring make contact with each other, while they are brought out of contact when the motor is rotating, by a distance equal to or shorter than an axial flying height determined on conical surfaces of the shaft and sleeve. Thereby, the start-up failure caused by the conical surface of the shaft being fitted in the sleeve when the motor is not in operation can be avoided, improving the reliability of the motor.

Alternatively, the grooves may be formed on both opposite taper surfaces of the shaft and the sleeve at the almost same axial positions. In this constitution, the grooves have different angular length from each other in the circumferential direction. Thereby, each delay, from the time point when the bearing clearance becomes small until the time point when the pressure in the lubricant in the clearance becomes local maximum by the corresponding groove, is varied in proportion to the corresponding angular length of each of the grooves. Thereby, an improved constitution which can avoid half whirls and other unstable movements of the motor can be provided.

BRIEF DESCRIPTION OF THE DRAWINGS

These and other objects and advantages of the present invention will become clear from the following description with reference to the accompanying drawings, wherein:

FIG. 10(a) and FIG. 10(b) are detailed views of the bearing section having a modified construction wherein grooves are formed on both opposite surfaces of the shaft and the sleeve, FIG. 10(a) being a plan view of the sleeve, and FIG. 10 (b) being a cross sectional view of the shaft and the sleeve.

DESCRIPTION OF THE PREFERRED EMBODIMENT

Preferred embodiments of a fluid dynamic bearing motor according to the present invention will be hereinafter described with reference to the accompanying drawings.

Figure 15:
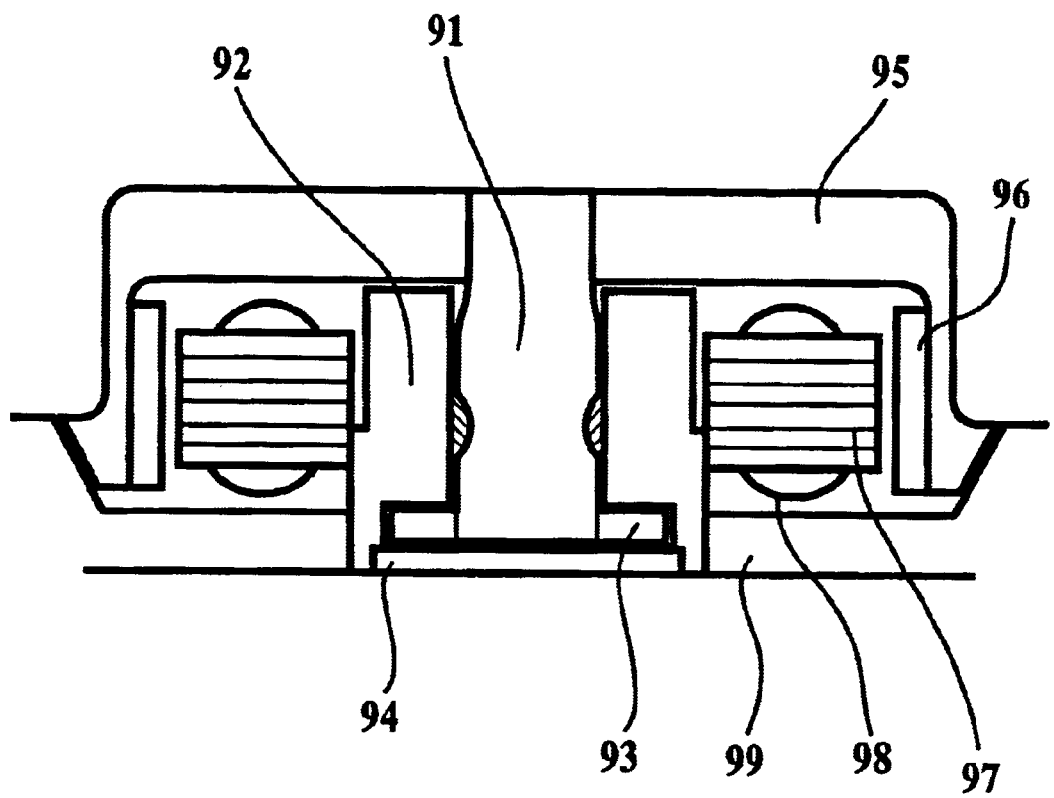
FIG. 15 is a cross sectional view of the prior art fluid dynamic bearing motor.

The prior art fluid dynamic bearing motor structure is reviewed by FIG. 15 before the description of present invention. The fluid dynamic bearing motor possesses two radial bearings which are provided on the surface of shaft 91 or cylindrical sleeve 92, and two thrust bearings which are provided on the surface of both sides of a thrust plate 93, and has herringbone grooves respectively in each bearing. The clearance between thrust plate 93, sleeve 92, and thrust bush 94 which compose thrust bearings are ten-micron meter level, and also the clearance between shaft 91 and sleeve 92 which compose radial bearings is two-micron meter level with the lubricant.

Two radial bearings and the existence of thrust plate 93 make the entire motor thin difficult. The bearing clearance and also the right angle degree of shaft 91 and hub 95, shaft 91 and thrust plate 93 should be well controlled at the mass production stage because the load capacity of the bearing depends on the clearance. These are factors of inncreasing the cost. Moreover the joint part of the thrust bush 94 and the sleeve 92 in a portion which the lubricant contacts, is joined to provide a seal by swaging, bonding, or laser welding. The lubricant leakage may be caused from the joint part space and a serious trouble is often invited. Reference numerals 96, 97, 98, and 99 respectively represent a rotor magnet, a stator core, coils, and abase.

Figure 1:
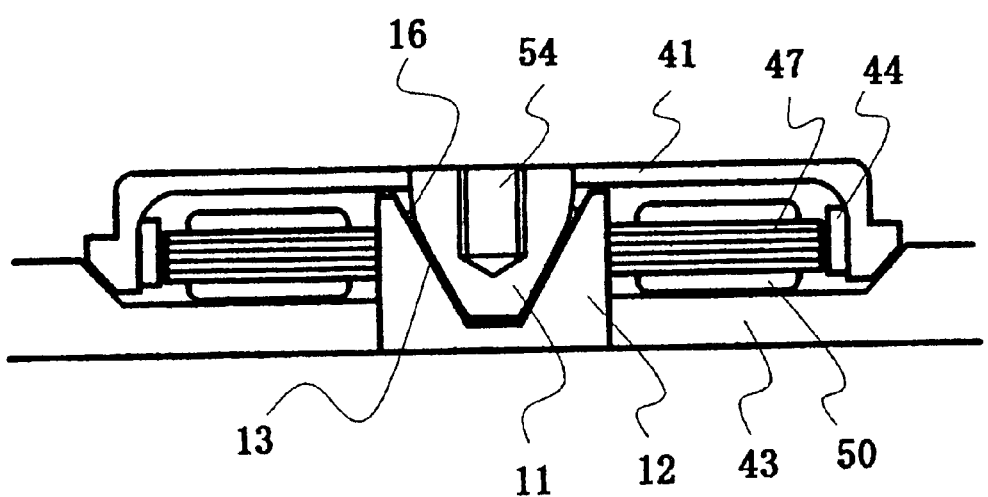
FIG. 1 is a cross sectional view showing a fluid dynamic bearing motor according to a first embodiment of the present invention.

FIG. 1 illustrates a cross-section of a fluid dynamic bearing motor according to a first embodiment of the invention. A shaft 11 has a diminishing conical taper, and a sleeve 12 arranged opposite the shaft 11 has a conical concavity. The clearance between the shaft 11 and the sleeve 12 is filled with oil as a lubricant. At the outer periphery of the conical surfaces, the clearance between the shaft 11 and the sleeve 12 increases in width towards outside, thereby forming a taper seal, where there is a boundary 16 of the lubricant. Rotary section is composed of the shaft 11, a hub 41, a rotor magnet 44, and others, and fixed section is composed of the sleeve 12, a base 43, a stator core 47, coils 50, and others. The stator core 47 and the rotor magnet 44 have their respective centers offset from each other in an axial direction so that magnetic attraction is developed between the rotary section and the fixed section. Reference numeral 54 represents a screw hole for fixing a disk (not shown).

The bearing section is constituted by the shaft 11, the sleeve 12, and a series of herringbone grooves, to be described later, provided in one of the conical taper surfaces 13 of the shaft 11 and the sleeve 12. The grooves serve to pump the lubricant toward their center to increase the pressure of the lubricant. The load capacity thereby created is in inverse proportion to the size of the clearance between the shaft and sleeve. Therefore, the clearance size is determined such that the axial components of the load capacity and the above-mentioned magnetic attraction are in equilibrium, while radial components of the load capacity are used for the centering of the shaft 11. Accordingly, the magnetic attraction, which determines the load capacity, is set so that the load capacity is large enough to support the rotary section during rotation. The clearance, accordingly, is approximately several micrometers wide. When the apical conical angle of the bearing section is large, the axial components of the load capacity may be given more consideration, while the radial components play a more important role when the apical conical angle is small. In this embodiment, the angle of the cone apex is slightly smaller than 60° so as to give more weight to the radial components to ensure precise centering of the shaft.

The stator core 47 and the coils 50 cooperate with the rotor magnet 44 to drive the rotary section. The rotor magnet 44 is slightly offset upwards from the stator core 47 in an axial direction, so as to generate magnetic attraction between the rotary section and the fixed section. The rotary section further includes a magnetic or optical disk or the like carried thereon as a load. The force applied to the interface between the shaft 11 and the sleeve 12 varies depending on the manner in which the memory device is installed in a normal state or inverted state. That is, if the device is set in a normal state, the bearing receives the weight of the movable parts in addition to the magnetic attraction. If the device is set in an inverted state, the bearing receives a load less than the magnetic attraction because the weight of the movable parts is subtracted therefrom. In light of this, the magnetic attraction should be approximately three times larger than the weight of the movable parts, which has empirically been confirmed to ensure stable rotating attitude of the rotary section. If the magnetic attraction is increased so as to create accordingly larger load capacity, precession of the shaft can further be restricted and its attitude can be made more stable. On the other hand, it has been ascertained that such increase in the magnetic attraction causes the sliding friction to become larger at the time of starting up or stopping the motor, resulting in shorter operable life of the bearing. Therefore, in the case of the fluid dynamic bearing motor for a small magnetic disk device, magnetic attraction should be approximately five times larger than the weight of the movable parts, which is the sum of the weight of the rotary section and the load weight. Such settings may be determined case by case depending on the required precision for the rotating attitude of rotary section.

Figure 2:
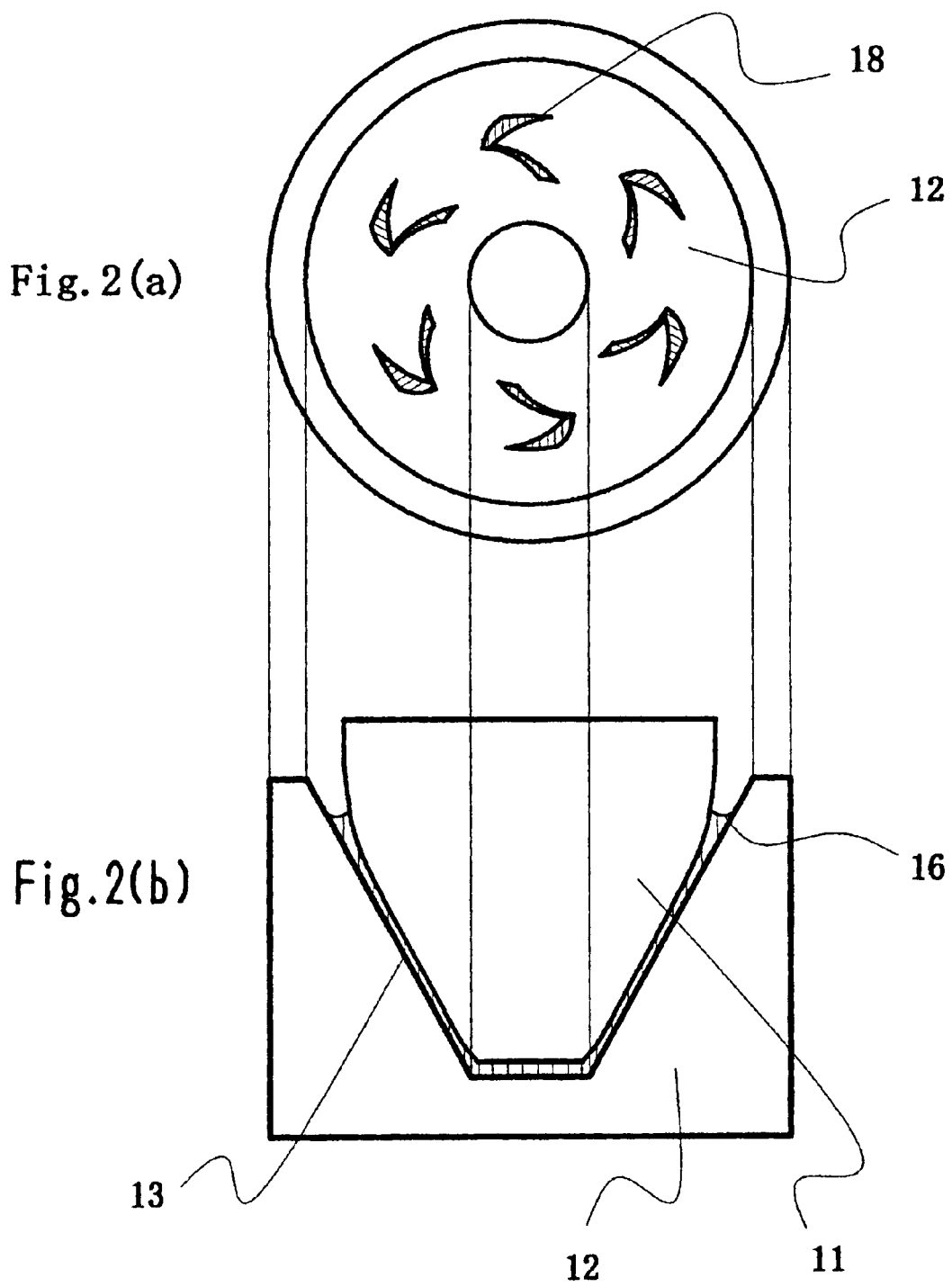
FIG. 2(a) and FIG. 2(b) illustrate the bearing section in detail, FIG. 2(a) being a plan view of a sleeve, and FIG. 2(b) being a cross sectional view of a shaft and the sleeve.

FIG. 2(*a*) and FIG. 2(*b*) illustrate the structure of the bearing section of the embodiment shown in FIG. 1 in more detail. FIG. 2(*a*) is a plan view of the sleeve 12, and FIG. 2(*b*) is a cross sectional view of the shaft 11 and the sleeve 12. As shown in FIG. 2(*a*), a series of herringbone grooves 18 is provided on the taper surface 13 of the sleeve 12. The grooves 18 are V-shaped shallow recesses of about several micrometers depth. When the motor rotates, the grooves 18 pump the lubricant from the outer and inner peripheral sides toward their central pointed ends to increase the pressure of the lubricant, so as to lift the shaft 11 from the sleeve 12 and support it in a flying state. In this embodiment, the grooves are formed so that the pumping capacity from the outer peripheral side toward the inner peripheral side is larger than that from the inner peripheral side toward the outer peripheral side, whereby the pumping capacity towards the inner peripheral side remains and the pressure of the lubricant on the inner peripheral side can be increased swiftly when starting up the motor, so as to decrease the sliding friction between the shaft 11 and the sleeve 12. The grooves 18 illustrated in FIG. 2(*a*) have larger groove length on the inner peripheral side, but this does not contradict the description in the foregoing, since the pumping capacity is determined by the diminishing degree of the circumferential length of the grooves and the radial length of the grooves.

Figure 3:
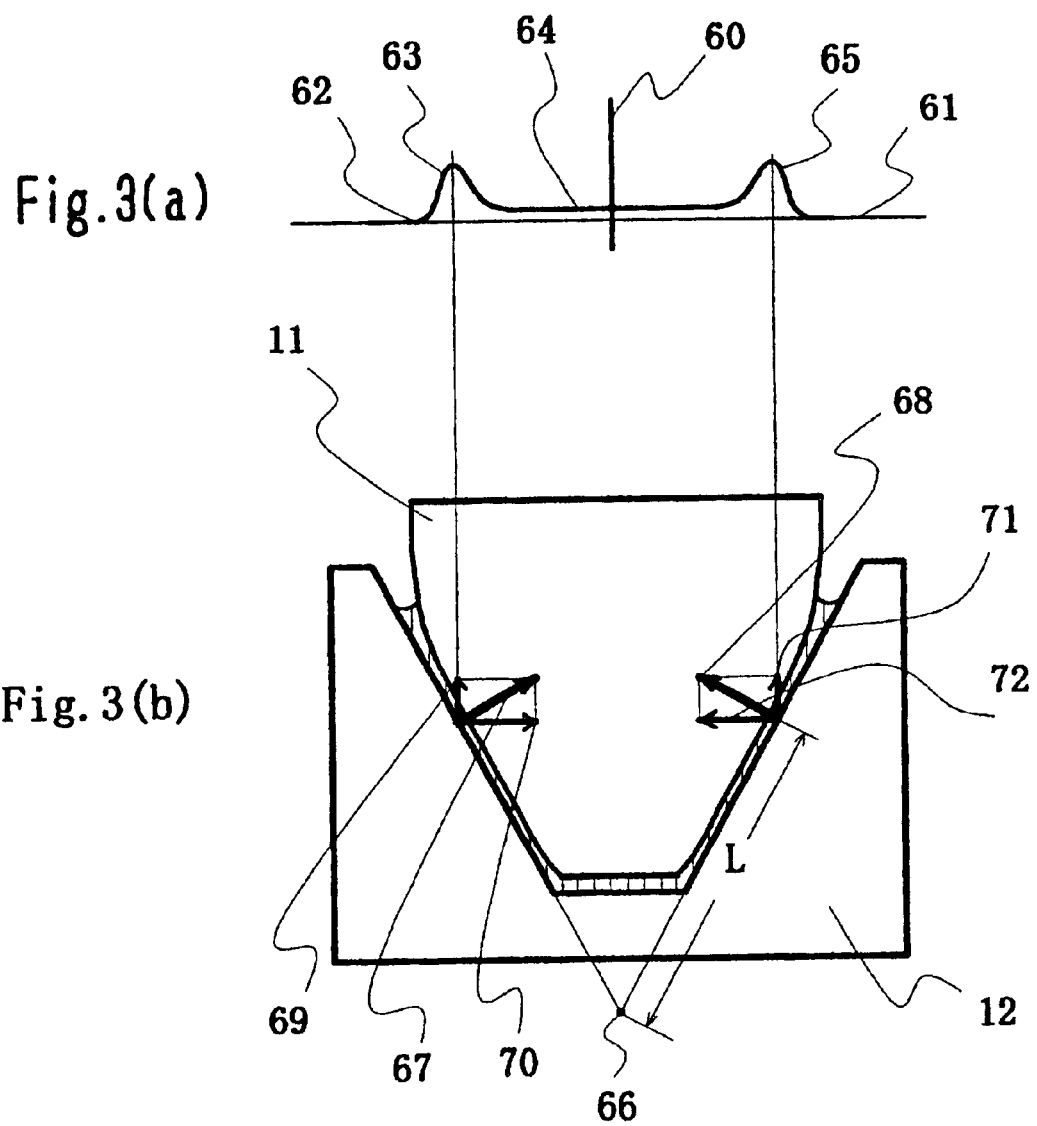
FIG. 3(a) illustrates the distribution of pressure developed during the rotation.
FIG. 3(b) illustrates a cross-section of the shaft and the sleeve, and component forces of load capacity.

FIG. 3(*a*) and FIG. 3(*b*) illustrate the distribution of pressure developed in the lubricant when the motor rotates and the component forces of the load capacity applied to the interface between the shaft 11 and the sleeve 12 in accordance with the pressure distribution. These drawings are given in explanation of how the rotating attitude of the shaft is self-adjusted.

FIG. 3(*a*) shows various features 62, 63, 64, and 65 of the pressure distribution of the lubricant caused by the grooves 18 in operation. The y-axis 60 represents pressure, while the x-axis 61 indicates radial coordinates corresponding to FIG. 3(*b*). The pressure reaches a highest point 63, 65 at positions substantially corresponding to the pointed ends of the V-shaped grooves 18. The drawing shows the pressure distribution without the influence of the atmospheric pressure, and therefore the pressure 62 at an outer peripheral point is almost zero. On the other hand, the pressure 64 at an inner peripheral point is higher than the atmospheric pressure, because the grooves 18 are formed to have larger pumping capacity towards the inner peripheral side.

FIG. 3(*b*) shows a cross-section of the shaft 11 and the sleeve 12. Reference numerals 67, 68 in FIG. 3(*b*) represent the load capacity created as the pressure in the lubricant increases. It should be noted that such a load capacity is created at each one of the several circumferentially located points, but only two of these are shown in a cross-section for the ease of explanation.

Reference numerals 69, 71 represent the axial components of the load capacity 67, 68, respectively. Reference numerals 70, 72 represent respective radial components thereof. Since the load capacity 67, 68 is substantially in inverse proportion to the size of the clearance between the shaft 11 and the sleeve 12, the clearance is determined such that the axial components 69, 71 and the magnetic attraction between the rotary section and the fixed section are in equilibrium. The radial components 70, 72 act in opposite directions so that they counterbalance each other, whereby the shaft 11 is centered.

The load capacity 67, 68 acts vertically to the conical surfaces. Thus, it acts on the shaft 11 as moment, i.e., the distance L multiplied by the load capacity 67, 68, where L is the distance from an imaginary fulcrum 66 corresponding to the cone apex and the point from which the load capacity 67, 68 acts. The moment resulting from the load capacity 67, 68 acts in reverse directions, and because the load capacity 67, 68 is substantially in inverse proportion to the nearby clearance between the shaft 11 and the sleeve 12, the moment caused by the load capacity 67, 68 acts around the fulcrum 66 as a position adjusting force for the shaft 11, counterbalancing each other to equalize the clearance between the shaft 11 and the sleeve 12. Thereby, the attitude of the shaft 11 is maintained upright, and its precession is restricted.

Viscosity of the oil used as the lubricant generally decreases at a high temperature, leading to a decrease in the load capacity. It is the practice in the prior art to set the load capacity high to allow for the decrease in pressure over a maximum limit of the temperature range for use, as a result of which there are the problems of excessive load capacity and large current at lower temperatures. According to the invention, the clealance between the shaft 11 and the sleeve 12 is changed corresponding to the equilibrium between the axial components 69, 71 of the load capacity 67, 68 and the magnetic attraction, and therefore the load capacity is kept substantially constant irrespective of the temperature. That is, a temperature compensation is automatically provided. This allows the load capacity to be set constant over the entire range of temperatures, eliminating the problems of excessive load capacity or current at low temperatures, and enabling a design with low current to be made.

Furthermore, the motor according to the invention is low in respect of bearing loss. Bearing loss of the fluid dynamic bearing is mainly caused by friction between the surfaces of the shaft 11 and sleeve 12 and the lubricant in small clearances where the grooves exist. The bearing according to the invention has only a series of grooves, which is a practical minimum, and thereby can achieve a reduction in required current.

The moment which acts on the shaft 11 to maintain its attitude is defined by the product which is obtained by multiplying the distance L by the load capacity 67, 68 as noted above. Therefore, there is no need to provide two series of grooves with a large span therebetween in an axial direction as in the prior art. The motor according to the invention needs only one series of grooves 18, therefore the structure is more simple and thinner than the prior art.

Figure 4:
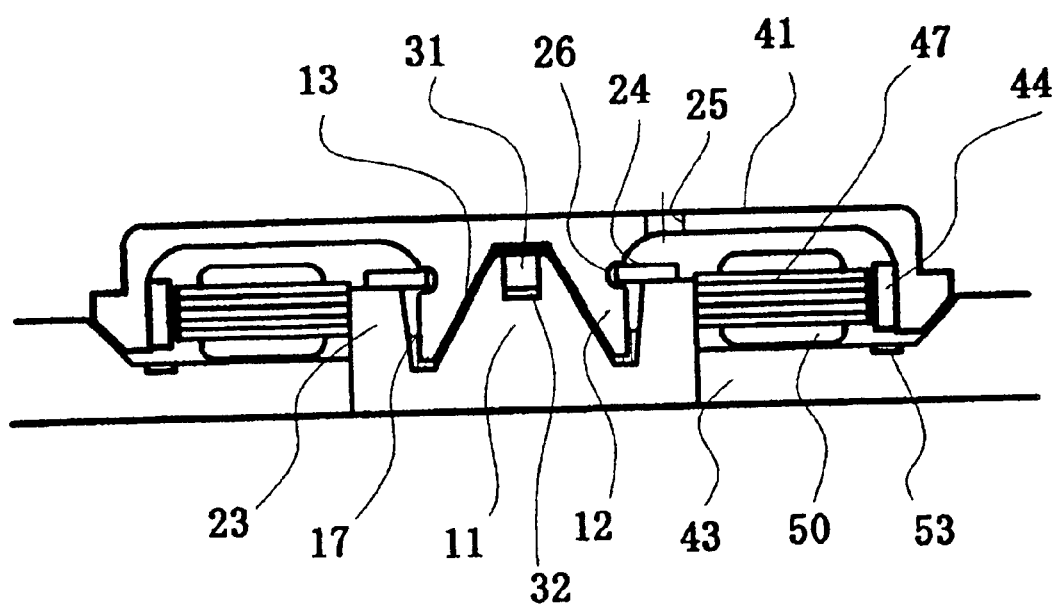
FIG. 4 is a cross sectional view showing a second embodiment of the invention having a different taper seal structure.

FIG. 4 is a cross sectional view of a fluid dynamic bearing motor according to a second embodiment of the present invention. A shaft 11 has a diminishing conical taper, and a sleeve 12 arranged opposite the shaft 11 has a conical concavity. The clearance between the shaft 11 and the sleeve 12 is filled with oil as a lubricant. The shaft 11 is surrounded by an annular wall 23, and the clearance between the annular wall 23 and the outer circumference of the sleeve 12 becomes wider in an axial direction, thereby forming a taper seal, where there is a boundary 17 of the lubricant. A magnetic piece 53 is fixed to the base 43 below the rotor magnet 44 so as to generate magnetic attraction between the rotary section and the fixed section. The shaft 11 has a cylinder 32 inside, in which is inserted a clearance adjusting piece 31.

Figure 5:
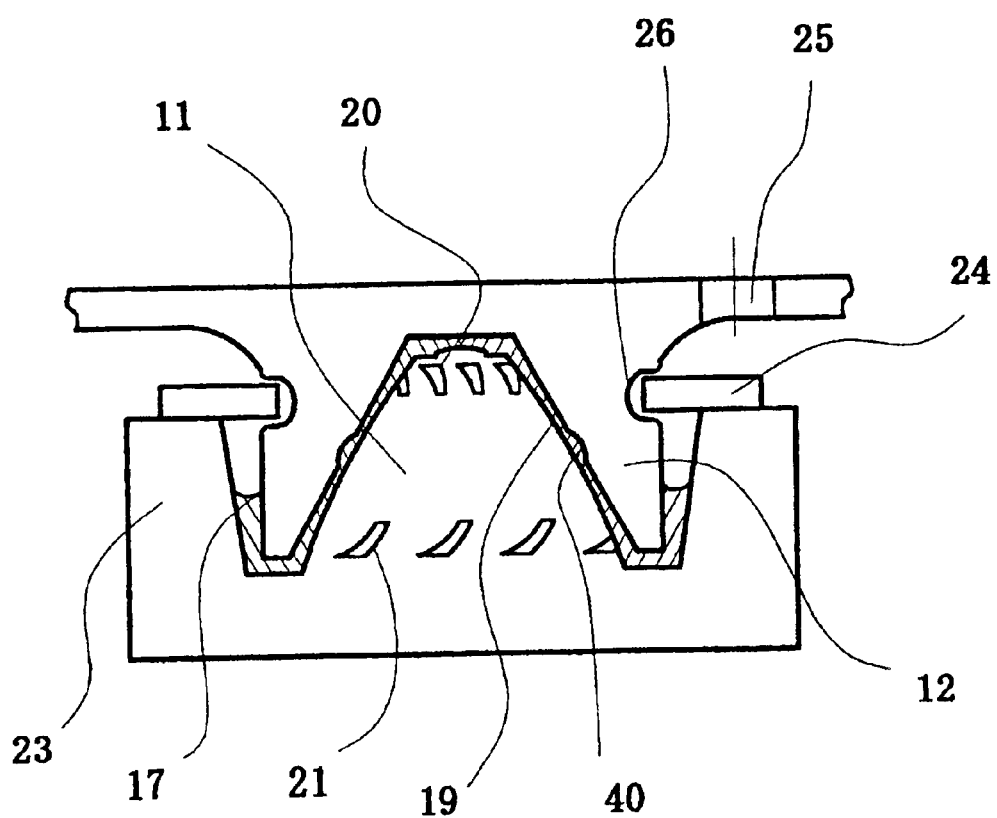
FIG. 5 is a detailed cross sectional view of the bearing section in the embodiment shown in FIG. 4.

FIG. 5 illustrates the structure near the bearing section composed of the shaft 11, sleeve 12, and annular wall 23 in more detail. The clearance between the annular wall 23 and the outer circumference of the sleeve 12 becomes wider in an axial direction, where a taper seal is formed, which provides a seal by the surface tension of the lubricant. To one end of the annular wall 23 is fixed a ring-shaped member 24, of which inner periphery fits in an annular recess 26 formed on the outer circumferential wall of the sleeve 12, thereby restricting displacement of the rotary section in axial directions. The ring-shaped member 24 is either resilient or partially cut out so as to be rotatably fitted into the annular recess 26 in advance during the assembly of the bearing components. Thereafter, the ring-shaped member 24 is fixed to the end face of the annular wall 23 by spot-welding or bonding through access holes 25 formed in the hub 41. Three such access holes 25 are provided at circumferentially spaced points so as to evenly secure the ring-shaped member 24.

Since the taper seal of the lubricant is formed not on the outer periphery of the conical bearing surface but on the outer circumference of the sleeve 12, the overall thickness of the motor can be made smaller. Meanwhile, the taper seal can have a sufficient space in the axial direction, whereby the taper angle can be made as small as 100 or lower to form a strong seal of the lubricant. The boundary 17 of the lubricant is therefore formed not between conical surfaces, but between substantially vertical outer walls of the sleeve 12 and the annular wall 23. Therefore there is no risk that the lubricant may leak under centrifugal force even in high-speed operation.

The herringbone grooves in the conical surface are formed to have flat region in central parts. While the grooves 20, 21 on both sides are shown in the cross sectional view so that their positions are more clearly understood, they are actually formed on the surface of the conical shaft 11, having a several micrometers depth. The shaft 11 has a slightly bulging crown 19 on its conical surface so as to have a flat band region where the bearing clearance is minimum. Correspondingly, a circumferential groove 40 of about 10 micrometers depth is provided in the sleeve 12 opposite the flat band region formed by the crown 19. Specific dimensions of the crown 19 may differ case by case depending on various conditions, but basically they are set such that the bearing clearance at the outermost periphery of the conical shaft 11 and the sleeve 12 is several micrometers larger than that in the flat band region. With this construction, even if the apical conical angles of the shaft 11 and the sleeve 12 are not precisely in conformity with each other, edge contacts at the inner and outer peripheries can be prevented. Therefore, the machining tolerance of the components can be made larger.

The herringbone grooves are made up of two types of spiral grooves for pumping in and pumping out purposes. In other words, pumping-out spiral grooves 20 are positioned on the inner peripheral side, while pumping-in spiral grooves 21 are arranged on the outer peripheral side, with the crown 19 for making the bearing clearance minimum positioned therebetween. The number of grooves per one round, the inclination angle of the grooves, and other features of the grooves can suitably be set according to their purposes.

Figure 6A:
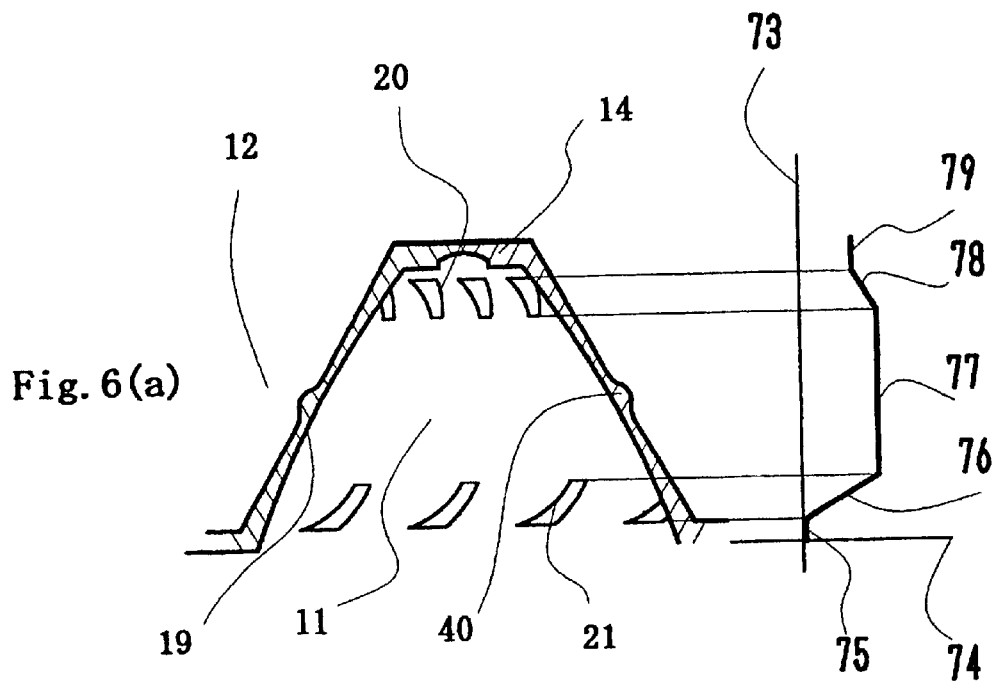
FIG. 6(a) illustrates a cross-section of the bearing section having a crown, with a graph showing the pressure distribution.

FIG. 6(a) shows the pressure distribution observed during the operation of the bearing having the above-described grooves. The y-axis 73 indicates axial coordinates, while the x-axis 74 represents pressure. Reference numerals 75, 76, 77, 78, and 79 represent mean pressure values in a circumferential direction at respective axial positions. The drawing shows the pressure distribution without the influence of the atmospheric pressure, and therefore the pressure 75 at an outer peripheral point is zero. The pressure increases as denoted by the reference numeral 76 because of the grooves 21, and becomes constant in the central region as indicated by the reference numeral 77. The pressure decreases at a position where the grooves 20 are formed as indicated by the reference numeral 78. At the top 14 of the cone, the pressure is slightly higher than the atmospheric pressure as indicated by the reference numeral 79.

Figure 6B:
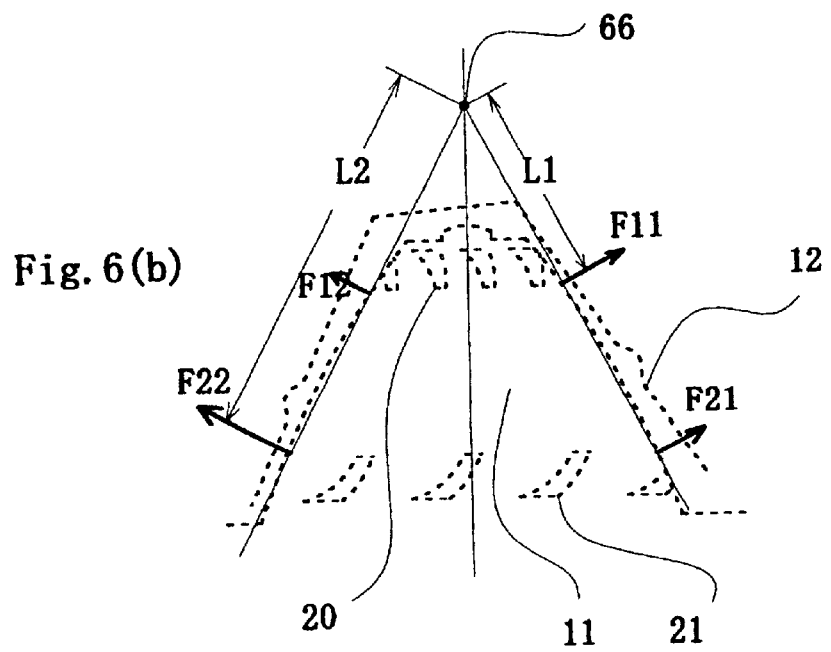
FIG. 6(b) illustrates how the load capacity acts on the rotary section when it is offset from the center.

The attitude of the rotary section is basically maintained by the high pressure 77 in the central region. A more specific account of the position adjusting mechanism will be given below with reference to FIG. 6(b). The pressure values 75, 76, 77, 78, and 79 in the pressure distribution of FIG. 6(a) are mean values in circumferential directions and they may locally vary if the sleeve 12 comes off-center or tilts with respect to the shaft 11. FIG. 6(b) illustrates a state wherein the sleeve 12 is rotating as being inclined leftward at the upper part thereof and rightward at the lower part thereof with respect to the shaft 11. The load capacity, created by the grooves 20 in the central region where the clearance is made small by the crown 19, becomes uneven in the circumferential direction, i.e., the load capacity F11 on the right side becomes larger than the load capacity F12 on the left side because the bearing clearance is smaller on the right side. Similarly, the pressure developed by the grooves 21 becomes uneven, the load capacity F21 on the right side being smaller than the load capacity F22 on the left side where the bearing clearance is smaller. Here, the load capacity acts on the upper part of the sleeve 12 as moment of L1*(F11−F12), while it acts on the lower part of the sleeve 12 as moment of L2*(F21−F22), where L1, L2 are the distances from an imaginary fulcrum 66 corresponding to the cone apex and the respective points from which the load capacity F11, F12, F21, F22 acts. The moment acts around the fulcrum 66 as a force to make the bearing clearance at respective points equal. It should be noted that the description given above is simplified and the moment actually counterbalances each other at all circumferential and axial points, not only on the left and right sides.

In this way, by arranging a series of herringbone grooves on the conical surface with a small clearance region therebetween, a moment force is generated that acts on the rotary section to equalize the upper and lower clearances between the shaft 11 and the sleeve 12, thereby adjusting the rotating attitude of the rotary section. Thus the precession is further restricted in the fluid dynamic bearing motor of this embodiment. When the sleeve 12 comes off center with respect to the shaft 11, the pressure in the lubricant locally increases because of the wedge effect in the intermediate small-clearance band region formed by the crown 19. A delay from the time when the bearing clearance is reduced until the time when a large pressure is developed may induce half whirls or other unstable movements of the rotary section. This is why the circumferential groove 40 is provided, as it distributes the locally collected lubricant in circumferential directions, thereby enhancing the position adjusting effect by the grooves and preventing half whirls.

Figure 7:
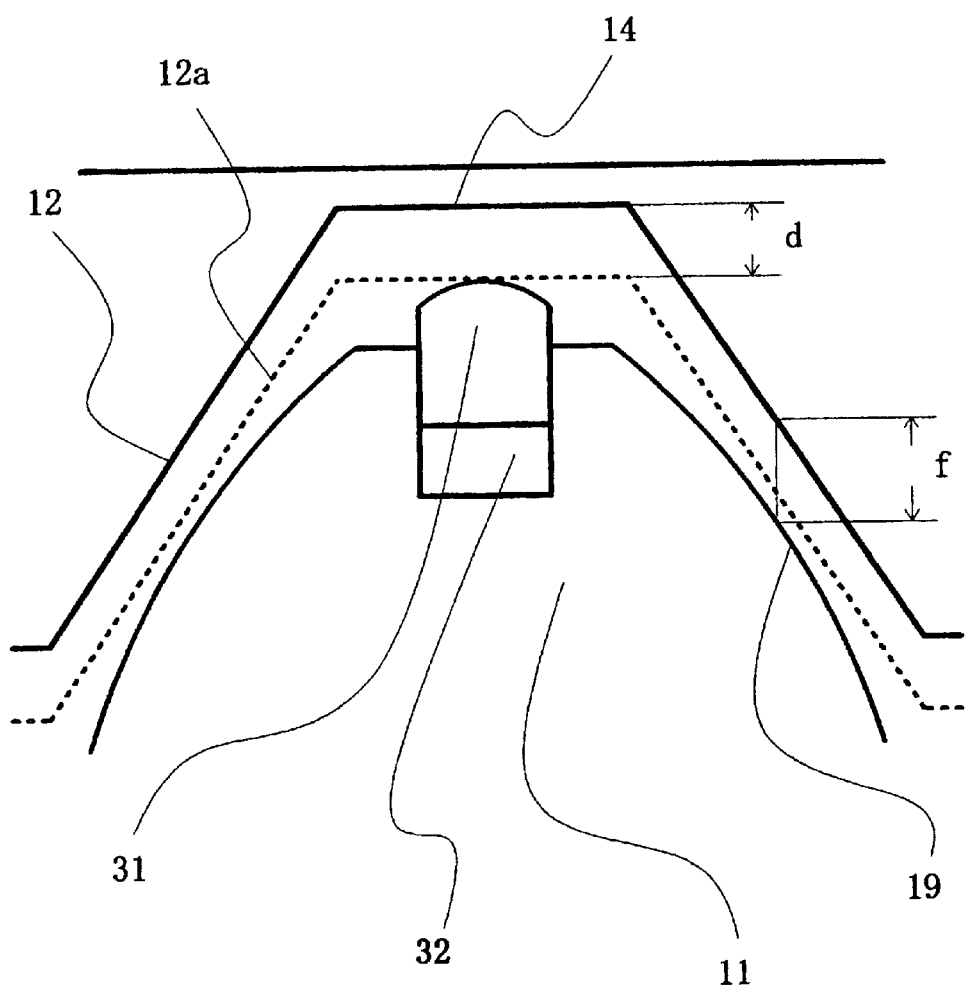
FIG. 7 is a detailed cross sectional view of the bearing section having a clearance adjusting piece at one end of the shaft for limiting contact between the shaft and the sleeve when they are stationary.
Figure 8:
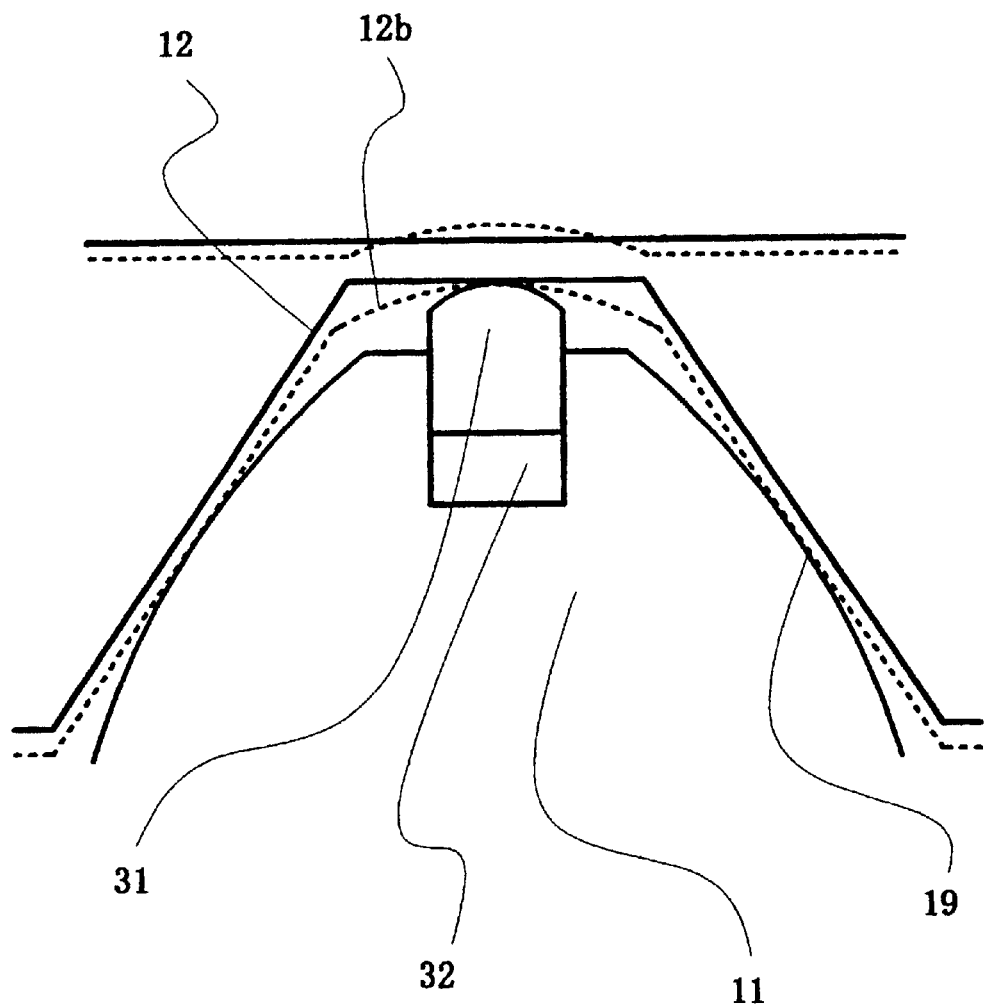
FIG. 8 is an explanatory view illustrating how the clearance adjusting piece of FIG. 7 is fitted in a predetermined position.

FIG. 7 and FIG. 8 are detailed views of the bearing section illustrating how the clearance adjusting piece prevents the shaft and the sleeve from making surface contact with each other when they are stationary. As shown in FIG. 7, the clearance adjusting piece 31 is provided at the top end of the shaft 11, such as to contact the inside top limit of the conical sleeve 12 when stationary. The dotted lines illustrate the position of the sleeve 12a when stationary, while the solid lines indicate the position of the sleeve 12 when rotating. The clearance adjusting piece 31 protrudes by a predetermined amount such that f≧d, where d is the distance between the top of the clearance adjusting piece 31 and the inside top limit of the sleeve 12, and f is the axial flying height of the sleeve 12 from the shaft 11 measured at conical surfaces. To be specific, the clearance adjusting piece 31 is protruded so that f−d is about 5 micrometers if the flying height is within the range of 10 to 20 micrometers, taking into account that the flying height f of the sleeve 12 varies depending on temperatures. Thus the top of the sleeve 12 flies up from the clearance adjusting piece 31 at least about 5 micrometers during rotation, while its conical surface flies up to an axial height of about 10 to 20 micrometers, maintaining a stable rotating attitude.

Conical bearings have a potential risk that the shaft fits into the sleeve, increasing the friction therebetween, resulting in start-up failure. This is caused by various factors such as the intensity of magnetic attraction, the apical conical angles, and the hardness of the material making up the shaft and sleeve, correlating with each other. Small motors to which the present invention is applied are relatively free of such troubles, but the structure shown in FIG. 7 further ensures that no such troubles will occur.

FIG. 8 is given in explanation of how the clearance adjusting piece shown in FIG. 7 is adjusted in position. The clearance adjusting piece 31 is initially fitted in the cylinder 32 inside the shaft 11 with clearance so as to be movable, but firmly enough to overcome the magnetic attraction. For assembling the clearance adjusting piece 31, it is placed upon the shaft 11 as being protruded substantially therefrom, and the sleeve 12 is coupled thereon. Pressure that is larger than the magnetic attraction is then applied to the sleeve 12 and the shaft 11 so that the clearance adjusting piece 31 contacts the inside top limit of the sleeve 12, until the shaft 11 and the sleeve 12 make surface contact with each other on their conical surfaces and the truncated cone apex of the sleeve 12 is resiliently deformed. The dotted lines indicate the deformed sleeve 12b under pressure, while the solid lines indicate the sleeve 12 having restored to have its initial truncated conical apex, after the pressure has been removed. As the sleeve 12 resiliently returns into its initial shape, a clearance is created between the conical surfaces of the shaft 11 and the sleeve 12. A plate spring may be arranged on the inside top limit of the sleeve 12 instead of utilizing the resilient deformation of the top of the sleeve.

After the position alignment, the clearance adjusting piece 31 should preferably be fixed in position by bonding or welding, so as to withstand large shocks. Further, it is preferable to provide antifriction measures on the top of the clearance adjusting piece 31 and the opposite inside top limit of the sleeve 12 such as application of a ceramic material or plating treatment, so as to ensure stable performance over a long time.

Single cone bearings have the characteristics that even when the shaft and the sleeve have slightly different diameters, they still can face each other at given axial positions, whereby the tolerance of their dimensions can be made large, offering the advantage of lower cost. The clearance adjusting piece 31 shown in FIG. 7 could initially be fixed to the shaft 11, but in that case the diameters of the shaft 11 and the sleeve 12 and the protruding amount of the clearance adjusting piece 31 must precisely be controlled. If the demands for the performance of the fluid dynamic bearing motor in regard to inhibition of NRRO are relatively low, then such control of dimensions could easily be achieved, while it is not if the demands are high. Thus the total cost would be lower with the structure wherein the clearance adjusting piece allows itself to be positionally adjusted as in this embodiment.

Figure 9A:
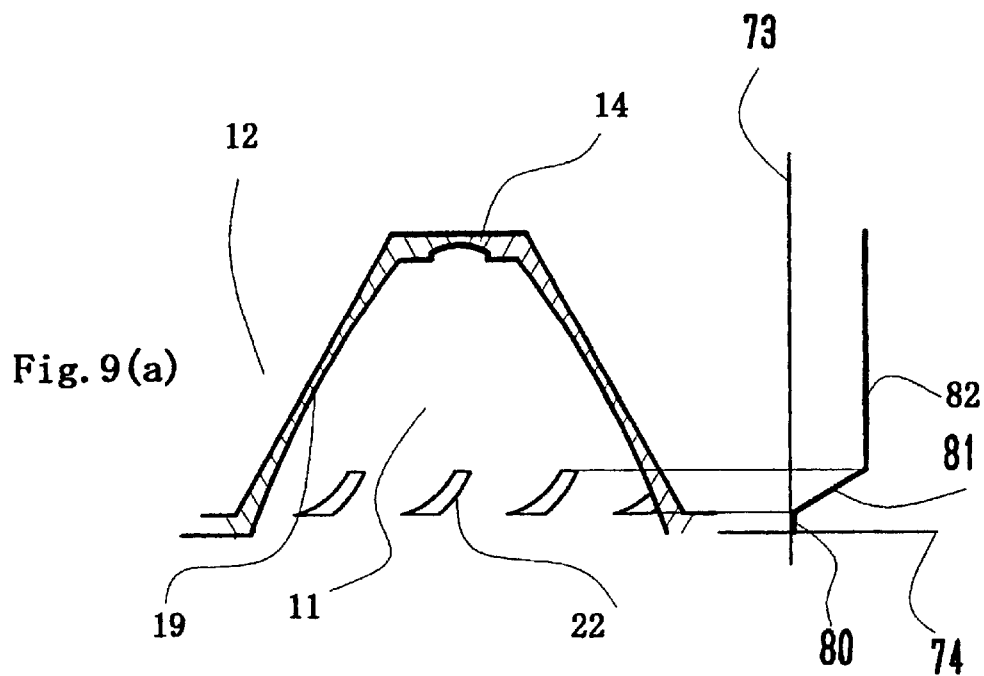
FIG. 9(a) illustrates the pressure distribution with a cross-section of the bearing section having a crown and spiral grooves.
Figure 9B:
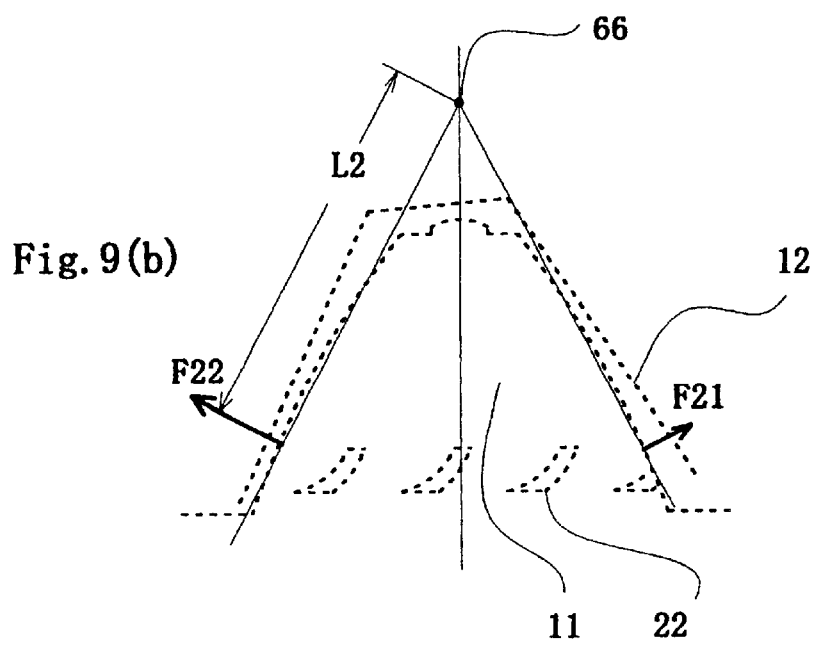
FIG. 9(b) illustrates how the load capacity acts on the rotary section when it is offset from the center.

FIG. 9(a) and FIG. 9(b) illustrate the bearing section having spiral grooves formed on the conical taper surface of the shaft 11. The conical shaft 11 has a crown 19 so that the clearance between its intermediate band region and the sleeve 12 becomes minimum. The spiral grooves 22 for the pumping-in purpose are provided on the surface on the outer peripheral side of the shaft 11. Reference numerals 80, 81, and 82 denote mean values of pressure at respective axial positions. As shown, the pressure becomes constant on the inner peripheral side from the spiral grooves 22 as indicated by the numeral 82. As can be seen from FIG. 9(b), the pressure may vary in circumferential directions in accordance with the change in the clearance between the shaft 11 and the sleeve 12 over the area from upper parts of the grooves to the small-clearance band region. FIG. 9(b) illustrates the load capacity F21, F22 in a state wherein the sleeve 12 is tilted leftwards and the bearing clearance is small on the lower left side. Since the load capacity is in inverse proportion to the bearing clearance, F22 is larger than F21. Thus, it acts on the sleeve 12 as moment of L2*(F21−F22), where L2 is the distance from the imaginary fulcrum 66 conforming to the cone apex to the point from which the load capacity F22 acts. The moment acts to equalize the bearing clearance, as a result of which the attitude of the sleeve 12 is adjusted. It should go without saying that the moment force acts circumferentially on the sleeve 12, although the drawing illustrates moment forces acting from only both sides for the ease of explanation.

In this embodiment, even without the crown 19, whenever the shaft comes off-center, the pressure distribution becomes uneven in the circumferential direction, whereby the moment acts on the shaft 11 to adjust its rotating attitude. However, the crown 19 causes the pressure distribution to become uneven at a more peripherally outer position, whereby the moment force L2*(F21−F22) can be made larger.

FIG. 10(a) and FIG. 10(b) show the vicinity of the bearing section according to a further modified construction of the second embodiment in which grooves are formed on both opposite surfaces of the bearing section. FIG. 10(b) is a cross-section of the shaft and the sleeve. On outer surface of shaft 11, a series of spiral grooves 20 is formed on its upper part for the pumping-out purpose, and another series of spiral grooves 21 is formed on its lower part for the pumping-in purpose. FIG. 10(a) shows a bearing surface of the sleeve 12 in a plan view. As shown, the sleeve 12 has on its bearing surface a plurality of spiral grooves 27 on its inner peripheral side for the pumping-out purpose, and a plurality of spiral grooves 28 on its outer peripheral side for the pumping-in purpose. The grooves 20, 21, 27, and 28 have a depth of about several micrometers, and grooves 20, 21 on the surface of the shaft 11 and those 27, 28 on the sleeve 12 have different angular lengths in the circumferential direction. In the specific example given in these drawings, the grooves 27, 28 on the surface of the sleeve 12 have angular lengths of more than twice as large as that of the grooves 20, 21 on the shaft 11 in the circumferential direction. The arrows 29, 30 indicate the direction in which the sleeve 12 rotates.

Grooves pump the lubricant when the bearing rotates to increase the pressure in the lubricant. The increased pressure, which is substantially in inverse proportion to the bearing clearance, causes a force to act on the rotary section to adjust its rotating attitude. Since the grooves are arranged at circumferentially spaced positions, even if the sleeve comes off-center with respect to the shaft and the bearing clearance becomes locally small, there is a delay until the balance in the circumferential pressure distribution is disturbed. This delay or time lag is in proportion to the angular length of the grooves in the circumferential direction. It is known that control systems with the time lag between the change in the controlled variable and the control over the change are susceptible to a resonant phenomenon, which, in the case of the fluid dynamic bearing, takes the form of precession, oil whip or other unstable movements.

In order to avoid such unstable movements, for example, the circumferential length of the grooves 21 may be varied so that the time lag is varied. However, if the angular lengths of only several grooves in one round are changed, the possibility of the position adjusting force not acting evenly increases, or other problem may arise. Therefore, in this embodiment, the grooves on the shaft 11 and those on the sleeve 12 are varied in their angular lengths in the circumferential direction so as to both achieve the circumferential evenness in the position adjusting force which is created by the increased pressure in lubricant, and the variety in the angular length of the grooves in the circumferential direction. Machining of the grooves is generally not easy and forming them on both bearing surfaces may lead to an increase in cost. However, the conical shaft 11 and the sleeve 12 in this embodiment can both be produced by molding, and therefore such grooves can be provided without increasing cost. Thus a fluid dynamic bearing motor with limited precession is realized.

Figure 11A:
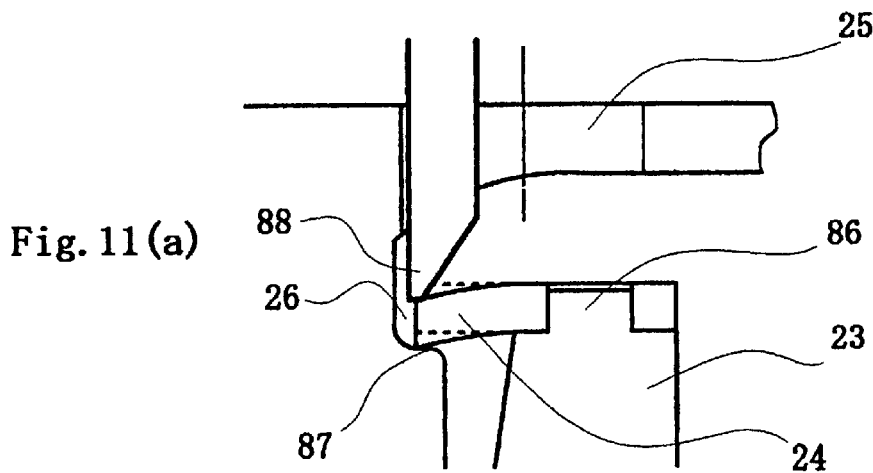
FIG. 11(a) and FIG. 11(b) are explanatory views illustrating how a ring-shaped member can be axially adjusted, FIG. 11(a) being an enlarged cross sectional view of the vicinity of the ring-shaped member, and FIG. 11(b) being a cross sectional view of the bearing section.
Figure 11B:
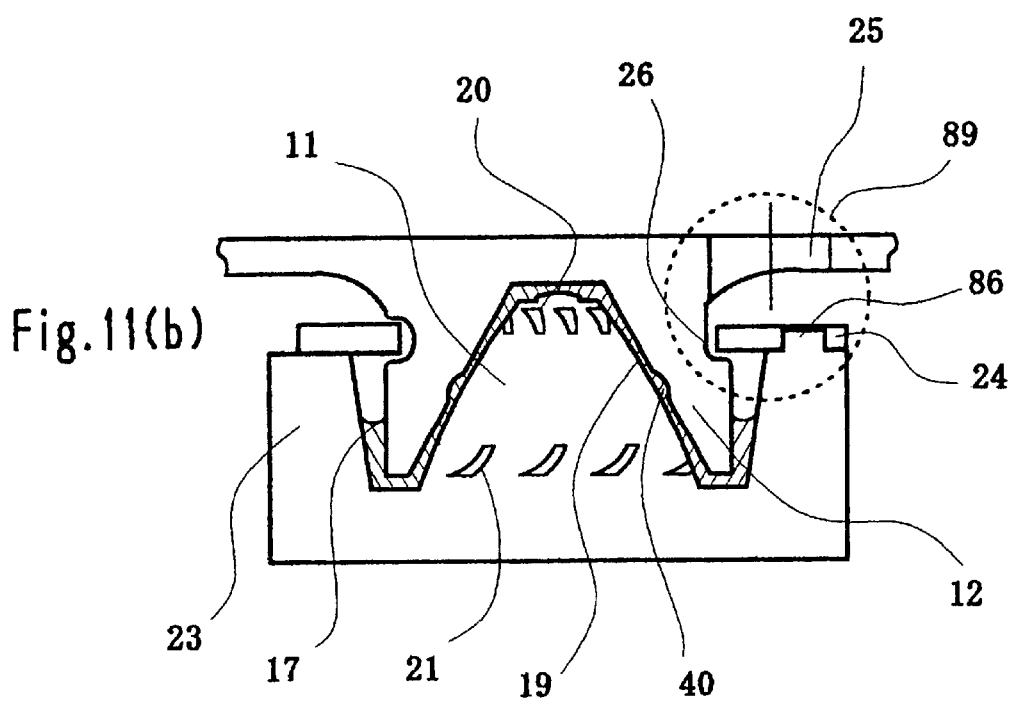

FIG. 11(a) and FIG. 11(b) illustrate a modified construction of the second embodiment wherein the ring-shaped member can be adjusted in axial directions. FIG. 11(b) is a cross sectional view of the bearing section, and FIG. 11(a) is an enlarged cross sectional view of part 89 of the ring-shaped member and other components. In this example, the annular wall 23 has a protrusion 86 on its upper end, while the ring-shaped member 24 has a corresponding through hole to match this protrusion. The ring-shaped member 24 is preliminarily coupled into the annular recess 26 around the sleeve 12 and assembled to the shaft 11. Access holes 25 are provided, through which the protrusion 86 and the through hole of the ring-shaped member 24 are engaged with each other. Then, using a jig 88, the inner periphery of the ring-shaped member 24 is abutted onto the end face 87 of the annular recess 26. The ring-shaped member is thus coupled to the protrusion 86 as being resiliently deformed.

In this assembling process, the ring-shaped member 24 is resiliently deformed in an axial direction by about 20 micrometers, while being coupled to the protrusion 86 firmly. Thereby, axial displacement of the rotary section including the hub 41 is restricted to be about 20 micrometers even if it is subjected to large shocks. In the case of hard disk drives, there is a strong demand for restricting axial displacement of the magnetic disk to a minimum. By utilizing resilient deformation of the ring-shaped member 24 as in this embodiment, such requirements can be met without higher demands for the tolerance of various components. Alternatively, the ring-shaped member 24 and the protrusion 86 may be joined after the assembly by bonding or welding to have a higher strength to withstand large impacts.

Figure 12:
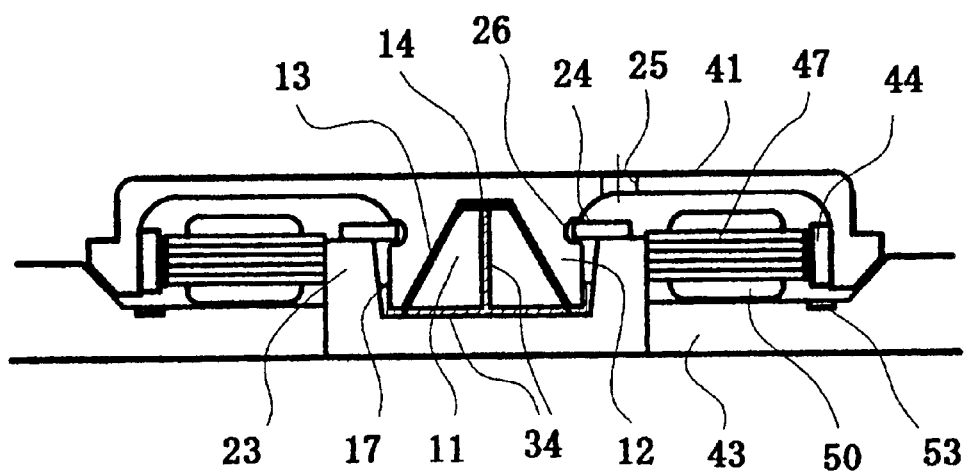
FIG. 12 is a cross sectional view of a modified construction of the second embodiment in which a channel is formed through the shaft.

FIG. 12 shows another modified construction of the second embodiment having a channel 34 that runs through the shaft 11 from its truncated cone top 14 to the outer periphery thereof. The channel 34 is provided for circulating the lubricant compressed towards the top 14 of the shaft 11 to the outside of the cone. The channel 34 is filled with fibrous or porous material to adjust the flow resistance such that pressure remains at the top 14 of the cone, whereby the sleeve 12 can fly up swiftly at the time of start-up, and whereby shock-absorbing effects are achieved because of the compressed lubricant that escapes and adjusts the damping level. Moreover, galls produced on the sliding parts can be removed with the structure of this example.

Figure 13:
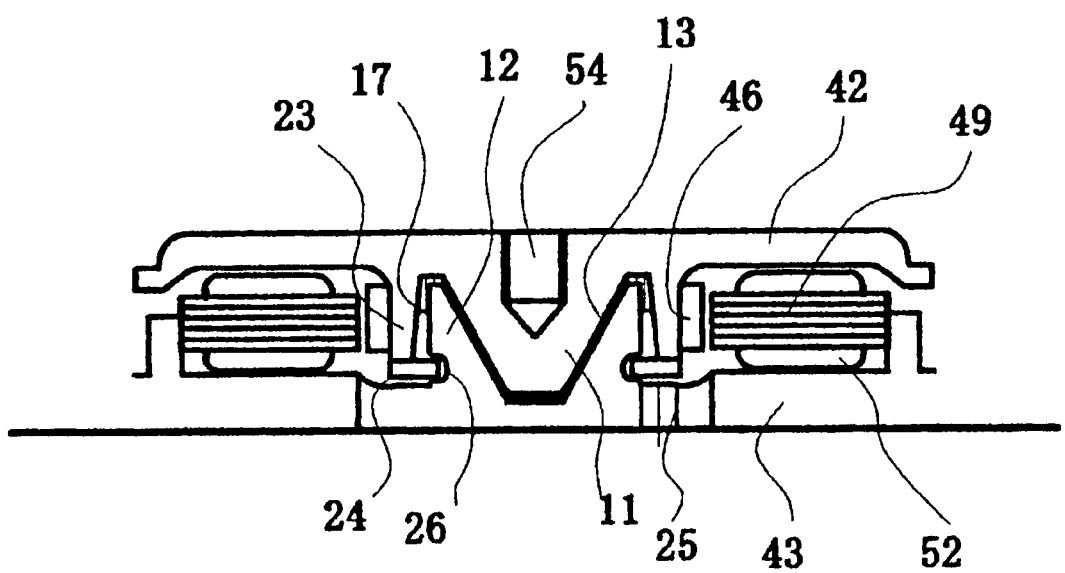
FIG. 13 is a cross sectional view of another modified construction of the second embodiment in which the shaft side is rotated.

FIG. 13 shows yet another modified construction of the second embodiment in which the shaft rotates and the rotor magnet is arranged on the inner peripheral side. The shaft 11 in the example shown in FIG. 4 is arranged on the fixed side, while the shaft 11 in the example shown in FIG. 13 is on the rotary side and the sleeve 12 is on the fixed side. This structure enables the inside space of the shaft 11 to be effectively used, for example, for forming a screw hole 54 therein for fixing a magnetic disk. The rotor magnet 46 is offset in the axial direction upwards from the stator core 49 to generate magnetic attraction. The operating mechanism of the bearing is substantially the same as that shown in FIG. 4 and will be no more described in detail. The components having same or similar functions are given the same reference numerals as those in FIG. 4 for the ease of understanding. Reference numerals 42 and 52 respectively represent a hub and coils.

Figure 14:
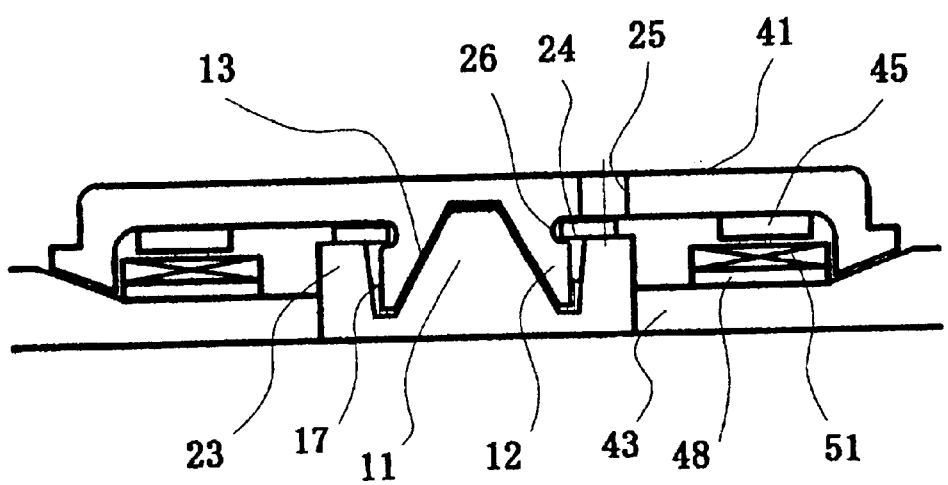
FIG. 14 is a cross sectional view of yet another modified construction of the second embodiment wherein the electromagnet system has a face-to-face arrangement.

FIG. 14 illustrates a further modified construction of the second embodiment, in which the electromagnet system for the rotary drive has a face-to-face arrangement so as to also obtain magnetic attraction between the rotary section and the fixed section. The structure of the bearing section is the same as that shown in FIG. 4 and its description will not be repeated. A plurality of rotor magnets 45 are circumferentially arranged and fixed to the backside of the hub 41 to create multipolar fields, having their orientation of magnetization in parallel to the shaft 11. Reference numeral 48 denotes a soft ferrite magnetic plate fixed to the base 43 for forming magnetic circuits between itself and the rotor magnets 45 to develop magnetic attraction between the rotary section and the fixed section. The coils 51 for the driving purpose are wound in spiral and placed circumferentially upon the ferrite magnet plate 48. The distance between the rotor magnets 45 and the ferrite magnet plate 48 should be as small as possible to achieve high efficiency of the electromagnetic system, and accordingly the coils 51 should preferably be formed as thin as possible using thin-film forming techniques.

In the embodiments shown in FIG. 1 and FIG. 4, the electromagnetic system for driving the motor is composed of the rotor magnet and the stator facing each other in radial directions. In such system, the magnetic attraction is created between the rotary section and the fixed section by the axial offset between the rotor magnet and the stator, or between the rotor magnet and the magnetic piece arranged axially opposite the rotor magnet. The plane-parallel face-to-face electromagnetic system shown in FIG. 14 can easily be assembled and therefore is suitable for an application as a fan motor or the like. On the other hand, it is apt to produce circumferential vibration in the hub and the base and may not be suitable as a motor for a memory device.

The presented embodiment employs a construction wherein no weld joints are formed between the members in a portion which the lubricant contacts. In the prior art, separate components were joined to provide a seal by swaging, bonding, or laser welding, but this was a major cause of later leakage of lubricant because of frequent bond failure, leading to a fatal fault. The present invention provides a fluid dynamic bearing motor free of the risk of oil leakage, as it eliminates joints in an area where the lubricant flows as shown in this embodiment.

For the material of the bearing components such as shaft and sleeve, any of the metal materials such as stainless steel or copper alloy which have commonly been used for the fluid dynamic bearing can be used. Preferably, a thin film of nickel, titanium, diamond-like-carbon, or molybdenum disulfide should be formed on one of the conical taper surfaces, so as to decrease the friction at the time of starting up and stopping the motor.

Regarding the manufacturing method of the bearing components, not to mention the shaft having a convex shape, the sleeve, although having a concave shape, it can be easily released, because its tapered top is opened. Therefore they both can be formed at one time including the grooves, by any known techniques such as press molding or injection molding. Accordingly, the bearing components can also be made of a ceramics or sintered alloy by molding, or of a resin material having superior antifriction properties such as polyphenyl sulfide resin (PPS) containing carbon fiber by molding, whereby a reduction in production cost is achieved.

Although the presented embodiments have been described as having the sleeve 12 and the hub 41 formed in one piece, they may be separate components and assembled together. Whether they should be produced in one piece or separately may be determined case by case so that the cost is lower, taking into consideration the characteristics and specifications required for each component. In the application of the invention to a hard disk drive as has been shown in these embodiments, however, there are stringent specifications with regard to the height and tilt of the install surface of the magnetic disk. Since these are strongly affected by their positional relationship with the bearing surface, it is more preferable to form the sleeve 12 and the hub 41 in one piece to achieve higher precision. The fluid dynamic bearing motor according to the present invention enables the integral structure of the sleeve and the hub and realizes a high-precision, low-cost motor.

According to a fluid dynamic bearing motor of the present invention, the bearing section has a simple structure wherein grooves are formed on a conical taper surface for increasing the pressure in lubricant and creating a load capacity, which is balanced with magnetic attraction. With this structure, the attitude of the rotary section in the bearing is made stable, and a reliable seal of the lubricant is achieved even in high-speed operation. The bearings can be mass-produced at low cost by molding, and the total thickness of the motor can be reduced. Further, a temperature compensation of the load capacity for supporting the rotary section is achieved, and the current required for operating the motor is reduced. Therefore, the motor according to the invention is particularly suitable for small, rotary memory device such as magnetic or optical disk devices, or cooling fans for CPUs.

While there has been described what are at present considered to be preferred embodiments of the present invention, it will be understood that various modifications may be made thereto, and it is intended that the appended claims cover all such modifications as fall within the true spirit and scope of the invention.

I claim:

1. A fluid dynamic bearing motor, comprising:
   a shaft including a truncated cone shaped side wall diminishing its diameter toward a free end of the shaft;

a sleeve having an inner wall forming a conical concavity accommodating the shaft and surrounding the side wall and the free end of the shaft, the inner wall opposing the wall of the shaft with a clearance;

electric magnetic means for causing relative movement of the shaft and the sleeve;

lubricant filled in the clearance;

a single series of herringbone grooves, formed on one of the side wall of the shaft and the inner wall of the sleeve, each of the grooves being composed of a pair of pumping out grooves inclined to pump out the lubricant when the shaft and the sleeve move relative to each other and a pumping in groove inclined to pump in the lubricant when the shaft and the sleeve move relative to each other, the pair of the grooves being inclined to form a substantially V-shape to increase the pressure between the pair of grooves and exert a force perpendicular to the plane of the side wall of the shaft, the perpendicular force causing a moment around the imaginary fulcrum of the cone; and magnetic means for causing an attractive force counter balancing vertical component of the force caused by the groove.

2. The fluid dynamic bearing motor according to claim 1, wherein the series of grooves comprises a single band of grooves acting substantially at one axial point along an axis of the conical taper surface.

3. The fluid dynamic bearing motor according to claim 1, wherein the magnetic attraction is approximately five times or more a weight of the rotating parts.

4. The fluid dynamic bearing motor according to claim 1, wherein the magnetic attraction is approximately three times or more a weight of the rotating parts.

5. The fluid dynamic bearing motor according to claim 1, wherein at least one of the wall of the shaft and inner wall of the sleeve is inclined at an outer region, to make the clearance between the walls increase in width outwardly to form a taper seal, with the fluid being filled up to the level in the clearance changing portion to form a boundary surface between the fluid and air there.

6. A fluid dynamic bearing motor, comprising:

a shaft including a truncated cone shaped side wall diminishing its diameter towards a free end of the shaft;

a sleeve including an inner wall forming a conical concavity accommodating the shaft and surrounding the side wall and the free end of the shaft, the inner wall opposing the wall of the shaft with a first clearance, the sleeve including a cylindrical portion including the inner wall and an outer wall, said shaft including an annular extension extending from the truncated conical portion to the outside of the cylindrical portion of the sleeve, the annular extension including an inner wall opposing the outer wall of the cylindrical portion of the sleeve;

electric magnetic means for causing relative movement of the shaft and the sleeve;

lubricant filled in a clearance;

a single series of herringbone grooves, formed on one of the side wall of the shaft and the inner wall of the sleeve, each of the grooves being composed of a pair of pumping out grooves inclined to pump out the lubricant when the shaft and sleeve move relative to each other and a pumping in groove inclined to pump in the lubricant when the shaft and sleeve move relative to each other, the pair of the grooves being inclined to form a substantially V-shape to increase the pressure between the pair of grooves and exert a force perpendicular to the plane of the side wall of the shaft, the perpendicular force causing a moment around the imaginary fulcrum of the cone; and magnetic means for causing an attractive force counter balancing vertical component of the force caused by the groove.

7. The fluid dynamic bearing motor according to claim 6, further including a clearance adjusting piece held within the shaft, the clearance adjusting piece being assembled with the shaft such that it is initially held movably but firmly enough to overcome the magnetic attraction as being substantially protruded from one end of the shaft, and is pressed into the shaft by a pressure larger than the magnetic attraction applied from both ends of the shaft and the sleeve to a predetermined position, where the cone apex of the sleeve or a plate spring interposed between the apex of the sleeve and the clearance adjusting piece is resiliently deformed, whereby when the motor is stationary the clearance adjusting piece and the apex of the sleeve or the plate spring make contact with each other, while they are brought out of contact when the motor is rotating, by a distance equal to or shorter than an axial flying height determined on conical surfaces of the shaft and sleeve.

8. The fluid dynamic bearing motor according to claim 6, further including a crown of about several micrometers provided on the conical taper surface of one of the shaft and the sleeve so as to make the clearance between opposite taper surface of the shaft and the sleeve be minimum at an axially intermediate region, wherein the grooves are spiral grooves and provided on one or both sides of said axially intermediate region where the clearance between the shaft and the sleeve is minimum, for pumping the lubricant towards said intermediate region; and further including a circumferential groove provided on the conical taper surface of at least one of the shaft and the sleeve where the clearance therebetween is minimum because of the crown.

9. The fluid dynamic bearing motor according to claim 6, wherein the grooves are formed on both opposite conical taper surfaces of the shaft and the sleeve at radially opposite positions, the grooves having different angular lengths from each other in a circumferential direction.

10. The fluid dynamic bearing motor according to claim 6, further including a ring-shaped member fixed to one end of said annular wall, and an annular recess provided in the outer circumferential wall of the sleeve and making engagement with the ring-shaped member so as to restrict axial movable distance of the rotating parts.

11. The fluid dynamic bearing motor according to claim 10, wherein the ring-shaped member is fixed to one end of the annular wall by any one of interfitting, bonding, and welding, access holes being provided in either one of a fixed member and a rotary member opposite said one end of the annular wall for enabling the fixing of the ring-shaped member to be performed.

12. The fluid dynamic bearing motor according to claim 11, further including a means for establishing coupling engagement between the ring-shaped member and one end of the annular wall, wherein the ring-shaped member is coupled to one end of the annular wall with an inner peripheral portion thereof being pressed, through the access hole, to be resiliently deformed and abutted onto an end face of said annular recess, whereby said resilient deformation of the ring-shaped member determines a permissible range of the axial displacement of the rotating parts.

13. The fluid dynamic bearing motor according to claim 6, wherein the series of grooves comprises a single band of grooves acting substantially at one axial point along an axis of the conical taper surface.

14. The fluid dynamic bearing motor according to claim 6, wherein the magnetic attraction is approximately five times or more a weight of the rotating parts.

15. The fluid dynamic bearing motor according to claim 6, wherein the magnetic attraction is approximately three times or more a weight of the rotating parts.

16. A fluid dynamic bearing motor according to claim 6, wherein the outer wall of the cylindrical portion of the sleeve and the inner wall of the annular extension of the shaft oppose each other with a second clearance therebetween, the annular extension includes a free end on the side not connected with the conical portion of the shaft, at least one of the walls being inclined to make the second clearance increase in width toward the free end of the annular potion, the second clearance being continuous with the first clearance between the outer wall of the conical portion of the shaft and inner wall of the cylindrical portion of the sleeve, and being filled with the fluid to form a taper seal.

17. A fluid dynamic bearing motor, comprising:

a shaft including a truncated conical shape with a free end and a conical surface, the diameter of the cone diminishing towards a free end of the shaft;

a sleeve including a bottom wall and an inner wall forming a conical concavity for accommodating the shaft, with the inner wall opposing the conical surface of the shaft with a clearance therebetween, the bottom wall having elasticity or a elastic member being interposed between the bottom wall and the free end of the shaft;

a lubricant filled in the clearance;

an electro-magnetic means for causing relative movement of the shaft and rotor;

a series of grooves formed on at least one of the conical surface of the shaft and the inner wall of the sleeve, the grooves being adapted for creating load capacity in the fluid when the shaft and sleeve move relative to each other;

means for generating magnetic attraction between the shaft and the sleeve to counter balance the force generated by the grooves; and a clearance adjusting piece held on the free end of the shaft, the clearance adjusting piece being assembled on the shaft such that it is initially held movably but not being moved by the attractive force of the magnetic attraction means with a portion of the clearance adjusting piece projecting from the free end of the shaft, that the bottom wall was or the elastic member abuts against the clearance adjusting piece to press the later into the shaft until the inner wall of the sleeve comes into contact with the conical wall of the shaft with the bottom wall of the sleeve or the elastic member elastically deformed, and that the elastic deformation is released to let the bottom wall or elastic member come out of contact with the clearance adjusting piece.

* * * * *